United States Patent
Tomida et al.

(10) Patent No.: US 6,652,086 B1
(45) Date of Patent: Nov. 25, 2003

(54) IMAGE ERASING DEVICE, AND IMAGE DISPLAY APPARATUS AND IMAGE RECORDING APPARATUS EQUIPPED WITH THE IMAGE ERASING DEVICE

(75) Inventors: Yoshinori Tomida, Atsugi (JP); Satoshi Yoshihara, Kawasaki (JP); Yoshio Hotta, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 09/680,972

(22) Filed: Oct. 6, 2000

(30) Foreign Application Priority Data

Oct. 8, 1999 (JP) .......................... 11-288818
Oct. 2, 2000 (JP) ........................ 2000-302288

(51) Int. Cl.[7] ............... B41J 2/01; B41J 11/60
(52) U.S. Cl. ................ 347/101; 15/52.2; 346/21; 400/700; 434/408
(58) Field of Search .................... 347/2, 3, 22, 35, 347/36, 104, 95, 101; 346/21; 15/52.2; 101/423; 434/408, 411, 412; 400/700

(56) References Cited

U.S. PATENT DOCUMENTS

| | | | | |
|---|---|---|---|---|
| 2,189,649 A | * | 2/1940 | Hutaff ....................... 400/700 |
| 4,207,578 A | * | 6/1980 | Marinoff .................... 347/35 |
| 4,413,266 A | * | 11/1983 | Aviram et al. ............. 346/21 |
| 4,571,599 A | * | 2/1986 | Rezanka ..................... 347/87 |
| 4,675,476 A | | 6/1987 | Kobayashi |
| 4,723,138 A | | 2/1988 | Hashimoto et al. |
| 5,319,820 A | * | 6/1994 | Forst ........................... 15/98 |
| 5,526,028 A | * | 6/1996 | Rottman ..................... 347/23 |
| 5,650,808 A | * | 7/1997 | Vincent et al. ............. 347/43 |
| 5,677,363 A | * | 10/1997 | Imagawa ................... 523/161 |
| 5,777,639 A | | 7/1998 | Kageyama et al. ........... 347/15 |
| 5,907,332 A | * | 5/1999 | Fujita et al. ................... 347/15 |
| 5,957,700 A | * | 9/1999 | Ariyama ....................... 437/417 |
| 6,000,946 A | * | 12/1999 | Snyders et al. .............. 434/365 |
| 6,039,481 A | * | 3/2000 | Ham .............................. 400/708 |
| 6,239,817 B1 | * | 5/2001 | Meyer ............................ 347/36 |
| 6,283,567 B1 | * | 9/2001 | Hori et al. ...................... 347/2 |
| 6,318,825 B1 | * | 11/2001 | Carau, Sr. ........................ 347/2 |

FOREIGN PATENT DOCUMENTS

| | | | | |
|---|---|---|---|---|
| EP | 556 668 A1 | * | 8/1993 | ........... C09D/11/16 |
| EP | 0 571 190 | | 11/1993 | |
| EP | 0 812 888 | | 12/1997 | |
| EP | 1 031 960 | * | 8/2000 | ............ G09G/3/00 |
| JP | 2-117261 | | 5/1990 | |
| JP | 5-16342 | | 1/1993 | |
| JP | 5-160940 | | 6/1993 | |
| JP | 6-64390 | | 3/1994 | |
| JP | 8-100140 | | 4/1996 | |
| JP | 8-106261 | | 4/1996 | |
| JP | 8-156491 | | 6/1996 | |
| JP | 10-250287 | | 9/1998 | |
| JP | 11-115169 | * | 4/1999 | .............. B41J/2/01 |

* cited by examiner

Primary Examiner—Stephen D. Meier
Assistant Examiner—Blaise Mouttet
(74) Attorney, Agent, or Firm—Fitzpatrick, Cella, Harper & Scinto (57) ABSTRACT

An image erasing device for erasing an image formed erasably on a recording medium is provided. An image display apparatus equipped with the image erasing device, and an image recording apparatus equipped with the image erasing device are also provided. The image erasing device includes a device for feeding the recording medium stepwise, and a cleaner for erasing the image forming on the recording medium by independently scanning the cleaner perpendicularly to the direction of feeding of the recording medium while the recording medium stays stationary.

30 Claims, 9 Drawing Sheets

IMAGE ERASING DEVICE, AND IMAGE DISPLAY APPARATUS AND IMAGE RECORDING APPARATUS EQUIPPED WITH THE IMAGE ERASING DEVICE

BACKGROUND OF THE INVENTION

1. Field of the Invention

The present invention relates to an image erasing device having a cleaner for erasing an image displayed on a display medium. The present invention also relates to an image display apparatus equipped with the image erasing device, and an image-recording apparatus equipped with the image erasing device, and an ink.

2. Related Background Art

Known image-display apparatuses include apparatuses employing a magnestyrus display medium or a liquid crystal display medium, and electric blackboards and whiteboards. These image-display apparatuses use a display medium repeatedly by erasing the displayed image to form another image. However, the method employing a magnestyrus, which uses repeatedly a monochromatic magnetic material, is difficult to be used for a color display. The method utilizing a liquid crystal has disadvantages such as low contrast of the displayed image, a small view angle, necessity for a backlight, relatively large power consumption for retaining the display due to the lack of memorizability, and so forth. Generally a physical method or a chemical method is employed for erasing an image recorded by an uncostly recording with a felt-pen or an ink-jet printer without the above disadvantages.

Image display apparatuses equipped with a physical erasing means are disclosed in Japanese Patent Application Laid-Open Nos. 5-160940, 6-64390, and 8-156491. In the disclosed apparatuses, an erasing pad having a length equal to the width of the display medium is brought into contact with the recording medium, and the erasing pad is relatively moved in the direction of feeding the display medium to erase a displayed image. A display apparatus equipped with an erasing means moveable independently of a display medium is disclosed in Japanese Patent Application Laid-Open No. 10-250287.

Image display apparatuses equipped with a chemical erasing means are disclosed in Japanese Patent Application Laid-Open Nos. 8-100140 and 8-106261. The disclosed apparatuses employ a liquid-absorbing means such as paper and a water-soluble polymer as the image display medium and are equipped with a means for erasing the image by use of a water-soluble erasing liquid. An apparatus equipped with an image erasing means employing light irradiation is disclosed in Japanese Patent Application Laid-Open No. 5-16342.

SUMMARY OF THE INVENTION

After comprehensive investigation, the inventors of the present invention noticed that, in the methods of the above-cited Japanese Patent Application Laid-Open Nos. 5-160940, 6-64390 and 8-156491, the erasing performance deteriorates by repeated use owing to accumulation of print dregs in the erasing pad, or turn-up or tailing of the erasing pad, and that the erasure can be imperfect owing to a large width of the cleaner causing nonuniform pressure-contact with the display medium, disadvantageously. The aforementioned Japanese Patent Application Laid-Open No. 10-250287 discloses neither a feeding means for feeding the display medium, nor erasure of the printed image during feeding of the display medium.

The methods of erasure with an erasing liquid disclosed in Japanese Patent Application Laid-Open Nos. 8-100140 and 8-106261 cause problems in replenishment of the erasing liquid and disposal of the waste liquid after the erasure. In the light irradiation method disclosed in Japanese Patent Application Laid-Open No. 5-16342 to render the ink invisible, the ink layers are superposed successively, so that the service life of the display medium is disadvantageously short.

The inventors of the present invention comprehensively investigated on effective and reliable methods for erasing an image on a display medium of an image display apparatus having a feeding means for feeding a display medium. As the results, the inventors of the present invention found that the image on the display medium can be reliably erased by feeding the display medium stepwise intermittently and driving a cleaner to scan the display medium in the direction perpendicular to the feeding of the display medium while the display medium stays stationary. Thus the present invention has been completed.

An object of the present invention is to provide an image erasing device, comprising a feeding means for feeding a display medium or a recording medium, and an erasing means for reliably erasing an image formed erasably on a recording medium, and an ink.

Another object of the present invention is to provide an image display apparatus equipped with the image erasing means.

A further object of the present invention is to provide an image recording apparatus equipped with the image erasing means.

The image erasing device embodying the present invention for erasing an image formed erasably on a recording medium comprises a means for feeding the recording medium stepwise, and a cleaner for erasing the image formed on the cleaner by independently scanning the recording medium perpendicularly to the direction of feeding of the recording medium while the recording medium stays stationary.

The image display apparatus, embodying the present invention, equipped with an image erasing means comprises a display medium, a means for feeding the display medium stepwise, and a cleaner for erasing the image formed on the display medium by independently scanning the cleaner perpendicularly to the direction of feeding of the display medium while the display medium stays stationary.

The image recording apparatus, embodying the present invention, equipped with an image erasing means comprises a means for feeding a recording medium stepwise, a cleaner for erasing the image formed on the recording medium by independently scanning the cleaner perpendicularly to the direction of feeding of the recording medium while the recording medium stays stationary, and an image-forming means for forming an image erasably on the recording medium.

The ink, embodying the present invention, comprises a pigment of one color selected from yellow, magenta, cyan, and black at a content ranging from 1% to 10% by weight, a polymer emulsion at a content ranging from 0.001% to 0.5% by weight, a glycol at a content ranging from 0% to 10% by weight, and an alcohol at a content ranging from 0% to 20% by weight based on the total weight of the ink.

DETAILED DESCRIPTION OF THE PREFERRED EMBODIMENTS

The present invention is described in detail by reference to preferable embodiments.

Firstly, an electronic blackboard employing a belt-shaped display medium is described as an embodiment of the image display apparatus equipped with the erasing device of the present invention.

Electronic Blackboard

FIGS. 1A, 1B, 1C, and 1D illustrate schematically a vertically oblong electronic blackboard. FIGS. 1A, 1B, 1C, and 1D are respectively a front view, a sectional side view, a sectional view of the top portion, and a sectional view of the bottom portion. The electronic blackboard, as shown in the drawings, comprises an ink cartridge 1 holding a color ink described later, a belt-shaped display medium 2, feeding means 3 (3',3") for feeding the display medium, an ink-jet head 4, a scanning means (not shown in the drawing) for scanning the ink-jet head, an ink-supplying means 5, a cleaner 7, and another scanning means for scanning a cleaner (not shown in the drawing). The scanning direction 104 of the ink-jet head 4, and the scanning direction 102 of the cleaner 7 are perpendicular to the feeding direction 100 of the display medium 2. The display medium is fed stepwise intermittently, and the ink-jet head 4 and the cleaner 7 are driven to scan while the display medium stays stationary. For the electronic blackboard, the most of the members are housed in a housing 8 so that at least the portion 8' of the housing counterposing the display face is made transparent.

Figure 1A:
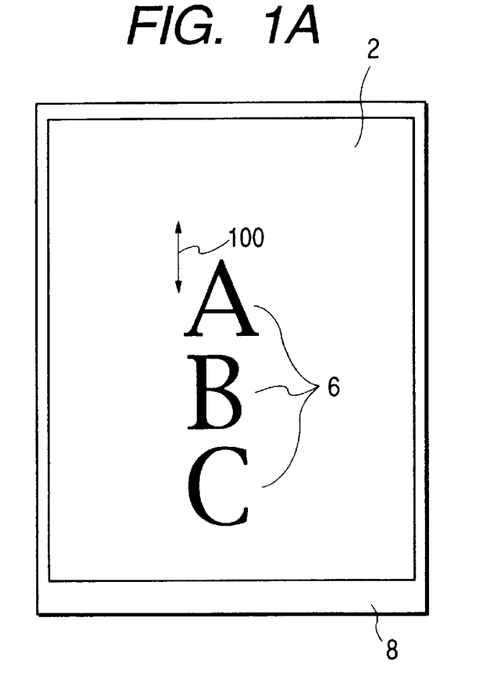
FIGS. 1A, 1B, 1C, and 1D illustrate the constitution of an electronic blackboard of the present invention.
Figure 1B:
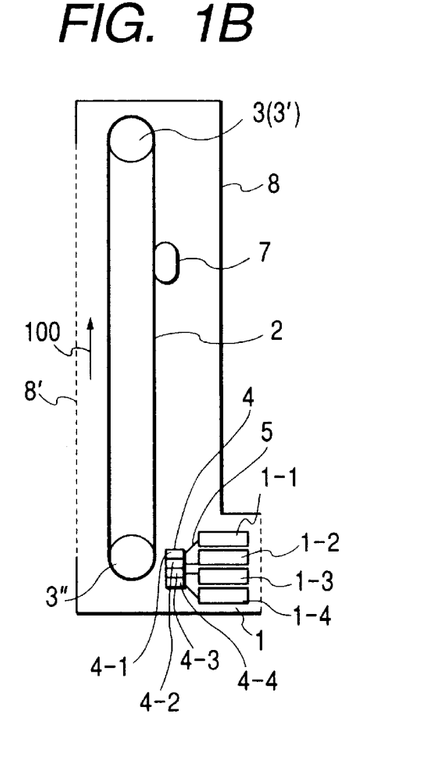
Figure 1C:
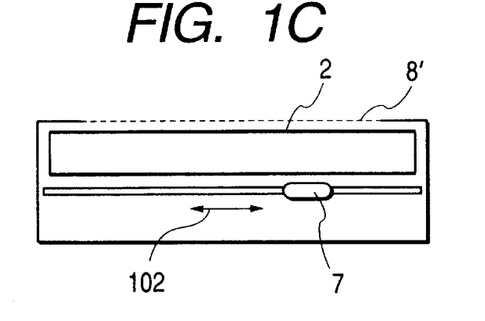
Figure 1D:
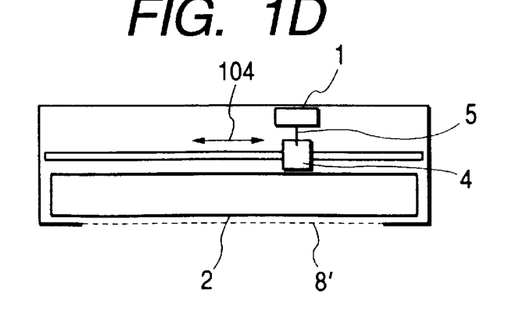

FIGS. 1B and 1C are sectional views of the electronic blackboard, showing the relations between the feeding direction 100 of the display medium 2 and the scanning directions 104, 102 of the ink-jet head 4 and the cleaner 7. More specifically, in the illustrated apparatus, the display medium 2 is fed in the vertical direction by the feeding means 3',3" such as rollers as shown in FIG. 1B. On the other hand, the ink-jet head 4 is driven to scan keeping a certain distance from the display medium 2, while the cleaner 7 is driven to scan in contact with the display medium 2, both of the ink-jet head 4 and the cleaner 7 scanning perpendicularly to the feeding direction 100 of the display medium 2, namely in the horizontal direction. The ink-jet head 4 and the cleaner 7 are driven to scan independently to each other while the display medium 2 is being stopped.

Specifically, while the ink-jet head 4 is scanning in the horizontal direction ejecting an ink for formation of an image 6, the display medium stays stationary. When the ink-jet head 4 has scanned a prescribed width of the display medium 2 to apply the ink for one line, the ink-jet head 4 stops, and in turn the display medium 2 is fed upward or downward for the subsequent one line. After the feeding of the display medium 2 for the one line, the subsequent image formation starts again at the same time of or after the completion of feeding of the display medium 2. Such operation is repeated to form a desired image 6 on the display medium 2. To erase the formed image 6, the cleaner 7 is allowed to scan in place of the ink-jet head 4.

FIGS. 2A, 2B, 2C, and 2D illustrate schematically a laterally oblong electronic blackboard. FIGS. 2A, 2B, 2C, and 2D are respectively a front view, a sectional view of the top portion, a sectional left side view, and a sectional right side view. This electronic blackboard is different from the one illustrated in FIGS. 1A to 1D in that the display medium 2 is fed in the horizontal direction 200 in FIGS. 2A to 2D, and the ink-jet head 4 and the cleaner 7 are driven to scan in the directions 204, 202 perpendicularly to the direction 200; the other feature of the constitution is the same as the one in FIGS. 1A to 1D.

Display Medium

The display medium of the aforementioned electronic blackboard is in a shape of a belt (endless, or held by a winding device at each of the respective ends). The display surface is preferably white. The usable material of the medium includes plastics such as polyethylene terephthalate containing a white pigment. The surface of the medium may be coated with an acrylic hard coat, a fluororesin coat, a silicone resin coat, or the like. The back face of the medium may be laminated with layers for various purposes.

The belt-shaped display medium 2 is fed in a prescribed direction by a feeding means 3 for the display medium by applying a tension to the display medium, for example, by at least two rollers 3',3", and rotating the rollers 3',3". The display medium 2 in an endless belt shape is made by working the belt to be seamless, which requires a large cost. Otherwise, the display medium may be provided with a winding mechanism at the both ends. In this type of display system, the belt-shaped display medium 2 is fixed to two rollers 3',3" at the ends respectively, and is wound up by the one roller 3' and unwound from the other roller 3" to feed the display medium 2. When the belt-shaped display medium has been wound up to the end, the rollers 3',3" are reversely rotated to return the belt-shaped display medium to the initial state.

Cleaner

As the cleaner 7, an erasing pad or a cleaning blade is preferably employed. The cleaner 7 should have such a hardness as not to scratch the surface of the display medium 2, and should be capable of reliably wiping off the image 6 and of holding the wiped ink. The erasing pad used for the cleaner is preferably made of a felt material composed of a high polymer fiber or a natural fiber softer than the display medium 2, and the shape thereof has preferably a surface roughness of several millimeters. On the other hand, the cleaning blade used for the cleaner is made of a material such as silicone resins and teflon resins, and the end of the cleaning blade has preferably a shape of an edge or a plate.

The cleaner 7 has a width larger than the one step width of the stepwise feeding of the display medium 2, and is driven to scan by a cleaner-driving means in the direction 302 perpendicular to the direction 300 of feeding the display medium and parallel to the ink-jet head scanning direction. The cleaner 7 is preferably disposed between the surface of the display medium 2, namely the display face, and the ink-jet head 4. Usually, the cleaner 7 erases the image 6 after the completion of the display and before the next display of another image 6.

Figure 3:
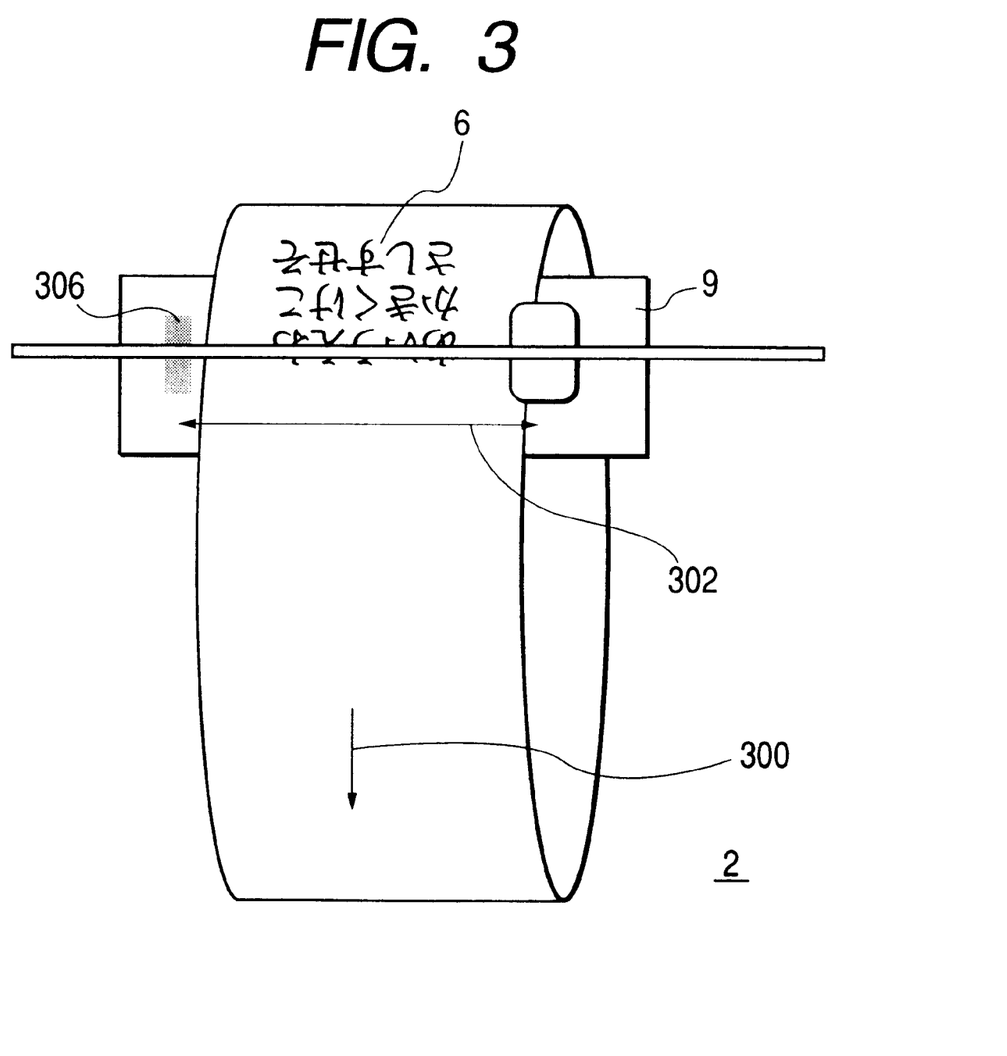
FIG. 3 illustrates the constitution of a cleaner (cleaner blade) of an electronic blackboard of the present invention.

A waste ink absorbing member 9 is preferably provided behind the display medium 2 as shown in FIG. 3. The waste ink absorbing member 9 is preferably comprised of a sheet of paper, nonwoven fabric, or a like material having an ink absorbency higher than that of the display medium 2 and the cleaner 7, and has preferably a length larger than the width of the display medium 2 to protrude from the both ends in the width direction of the display medium 2.

In the case where the waste ink absorbing member 9 is employed, the cleaner 7 is preferably constituted such that it is driven to scan the display medium 2 as brought into contact therewith from one end through the other end of the display medium 2 to wipe off mechanically the ink by collecting the ink of the erased image 6 on the cleaner surface (uneven portion) and stop on the waste ink absorbing member 9 after passing through the other end of the display medium 2. Thereby, the ink of the erased image is transferred to the waste ink absorbing member 9 to keep the cleaner 7 clean and to enable complete wiping of the surface of the display medium 2 for another display. Since the cleaner conducts wiping in contact with the display medium, the waste ink absorbing member 9 is preferably supported from the backside by a supporting plate (not shown in the drawing) having an appropriate strength.

Ink-Jet Recording Apparatus

Figure 2A:
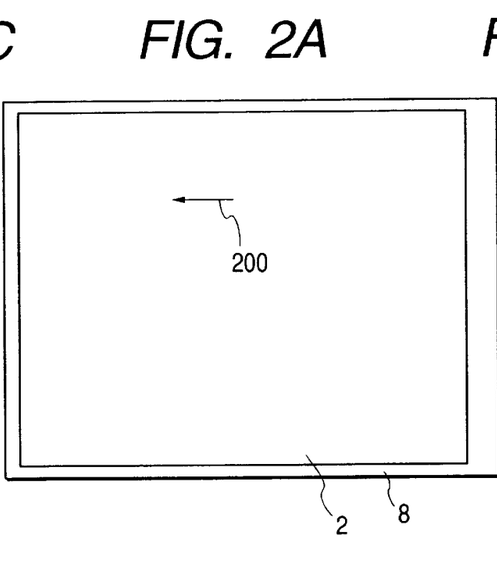
FIGS. 2A, 2B, 2C, and 2D illustrate the constitution of another electronic blackboard of the present invention.
Figure 2B:
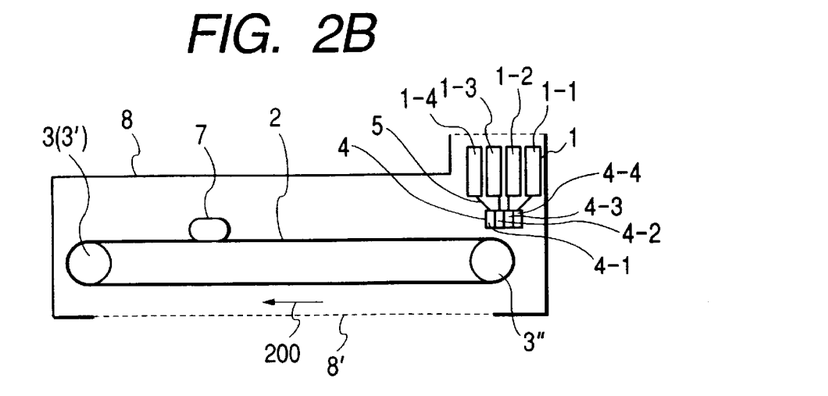
Figure 2C:
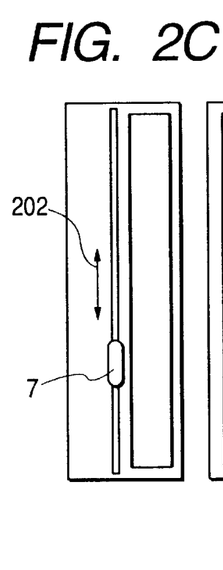
Figure 2D:
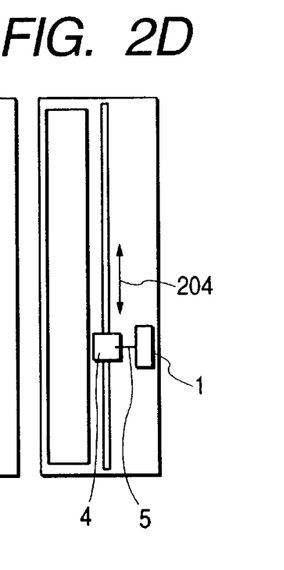

The electronic blackboard may employ, as the means for image recording, an ink-jet recording apparatus. For example, four kinds of inks of yellow, magenta, cyan, and black are introduced into an integrated ink cartridge 1 (1-1, 1-2, 1-3, 1-4) respectively as shown in FIG. 2B; the inks are supplied through an ink-supplying means 5 to an ink-jet head 4 (4-1, 4-2, 4-3, and 4-4). The inks are ejected from the ink-jet head 4 onto the surface of a display medium 2 in response to information signals, so that a desired color image 6 (a mono-color image or a full-color image with four color inks) is formed. The formed image 6 which has become unnecessary is erased by a cleaner 7 as described before.

The ink-jet head 4 is disposed before the display medium at a non-display position where the maintenance of the head can easily be managed as shown in FIG. 1B and FIG. 2B. As described later, this ink-jet head 4 is carried by a carriage (ink-jet head scanning means) for scanning perpendicularly to the feeding direction of the display medium 2, namely in the breadth direction of the display medium 2.

In the above constitution, the four color heads of the four-color ink-jet head 4 are preferably arranged in line with the feeding direction of the display medium 2 in view of the shot-in quantity (the quantity of the inks applied on the medium), the drying time, and other reasons.

On the other hand, in a usual ink-jet recording system, the integrated color-ink heads are arranged in line with the scanning direction of the recording head to enable overlap printing in a short time of scanning the pitch of the recording heads of the respective colors. This arrangement is adopted in consideration of the precision of the ink dot registration, the miniaturization of the apparatus, and because printing is conducted on a penetrable display medium on which a paper for normal jet-printing or a medium having ink-absorbency is formed so that the ink medium can rapidly be absorbed to cause less ink bleeding. Moreover, in a usual ink-jet recording system, dyes are used as a colorant. Therefore, overlap printing of a base color on a previously printed and dried color area causes elution of the dye, resulting in the same results as the printing without drying.

In the electronic blackboard, the display medium is nonpenetrable, requiring a time for drying of ink, but instead, miniaturization and resolution are not necessary in comparison with the ink-jet recording system. Therefore, the above apparatus constitution is preferred. By use of the pigment ink mentioned later, the water resistance of the dried image is improved to enable overlapped printing. From the same reason, a plural color ink-jet head is preferably integrated into one body with the intervals of respective ink-jet nozzles of twice or more the ink droplet diameter, more preferably with the intervals of four times or more the ink droplet diameter.

In the electronic blackboard, when a density of a shot-in ink for an image to be formed on the display medium exceeds a predetermined level, the picture elements are preferably thinned out, or the ink ejection is preferably thinned out. The thinning-out of the ink ejection, when a density of a shot-in ink for an image to be formed on the display medium exceeds a predetermined level, signifies that ink ejection is partially omitted, for example, such that, for an input signal exceeding 80% in terms of 100% of shot-in quantity (one-color solid printing), the output (ink ejection) is limited to 80%. The thinning-out of the picture element, when a density of a shot-in ink for an image to be formed on the display medium exceeds a predetermined level, signifies that, in gradation by 2×2 matrix, a solid print area (100%) of four picture elements is represented by 3 picture elements with one picture element omitted to form a solid image with three picture elements. In such a manner, preferably the bleeding of the image is effectively prevented, even though slight decrease of OD can occur. Incidentally, the partial omission of the ink ejection is conventionally conducted for prevention of cockling of paper.

In other words, the apparatus is preferably constituted so as to decrease the contact of the ink drops immediately after the printing, even if the resolution (or the gradation) becomes lower. In comparison with the dye ink, the pigment ink mentioned later has a high contrast ratio, giving sufficiently a high image density even with lower printing density and with thinning-out of the image density as well as giving higher color reproducibility by overlapped printing than by superposed printing.

An example of the ink-jet recording apparatus is one in which thermal energy is applied to an ink in a liquid chamber in recording head in response to recording signals to generate liquid droplets by the thermal energy. A suitable ink-jet recording apparatus for the electronic blackboard is explained by reference to FIGS. 4 to 9.

Figure 4:
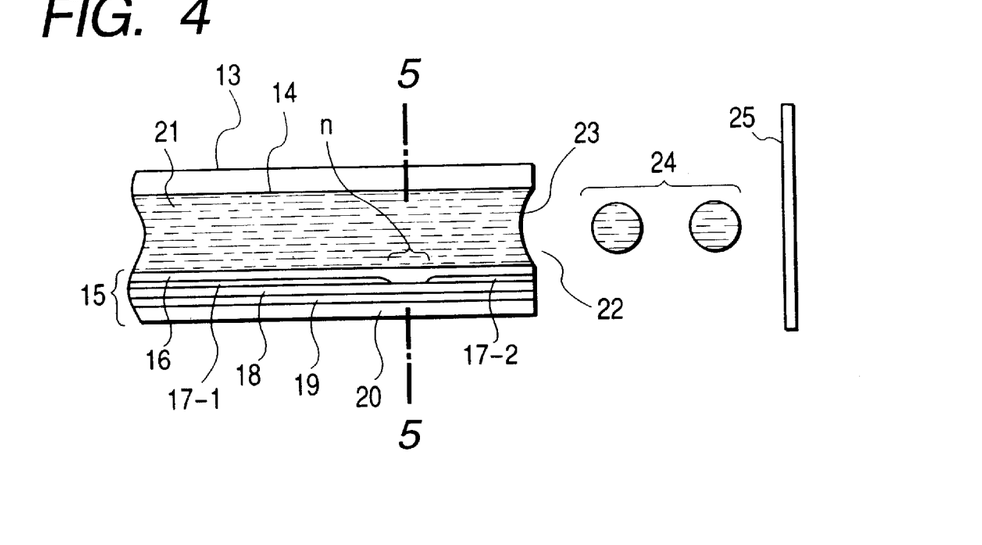
FIG. 4 is a schematic sectional view showing the constitution of an ink-jet head used in the present invention.
Figure 5:
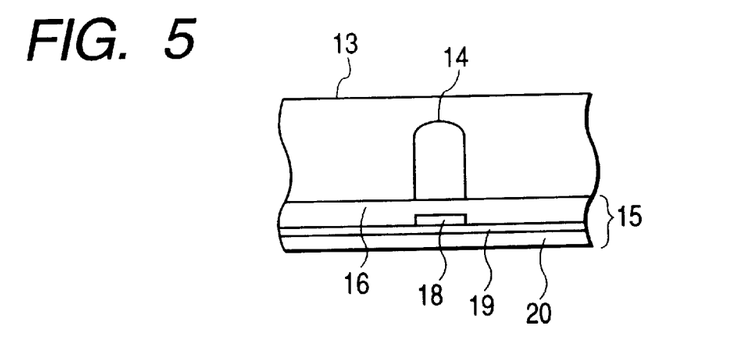
FIG. 5 is a sectional view taken along line 5—5 in FIG. 4.
Figure 6:
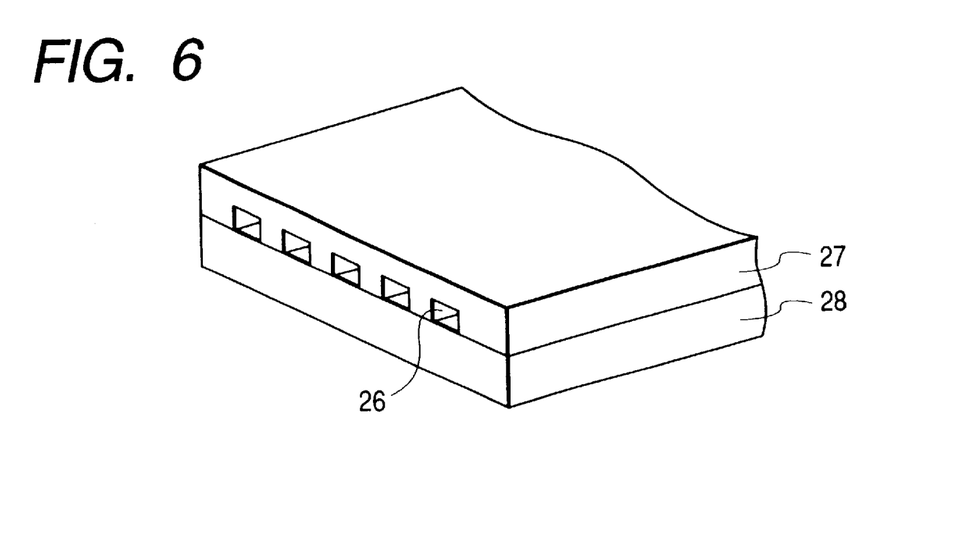
FIG. 6 is a schematic perspective drawing of a multi-nozzle head comprised of plural nozzles similar to that shown in FIG. 4.

FIGS. 4, 5, and 6 show an example of constitution of a head, the main part of the apparatus.

The head 13 is constructed by bonding a plate of glass, ceramics, plastics, or the like having a groove 14 for ink flow, as shown in FIG. 5, with a heating head 15 for thermosensitive recording (not limited to the head shown in the drawing). The heating head 15 is composed of a protective film 16 formed of silicon oxide or the like; aluminum electrodes 17-1, 17-2; a heating resistor layer 18 formed of nichrome or the like; a heat-accumulating layer 19; and a substrate 20 made of a heat-radiating material such as alumina. An ink 21 reaches an ejection orifice (fine hole) 22, and forms there a meniscus 23 by Pressure P.

On application of an electric signal information to the electrodes 17-1, 17-2, the region denoted by a symbol n on the heating head 15 generates heat to abruptly form a bubble in the ink there, the pressure of the bubble pushes out the meniscus 23 to eject the ink 21 through the ejection orifice 22 in a shape of a recording droplet 24. The ejected ink droplet travels toward a display medium 25 of an electronic blackboard.

FIG. 6 shows an external appearance of a multi-nozzle head having juxtaposed plural nozzles similar to that shown in FIG. 4. The multi-nozzle head is formed by bonding a glass plate 27 having multi-grooves 26 with a heat-generating head 28 similar to the one shown in FIG. 4. FIG. 4 is a sectional view of the head 13 along an ink flow path. FIG. 5 is a sectional view taken along line 5–5 in FIG. 4.

Figure 7:
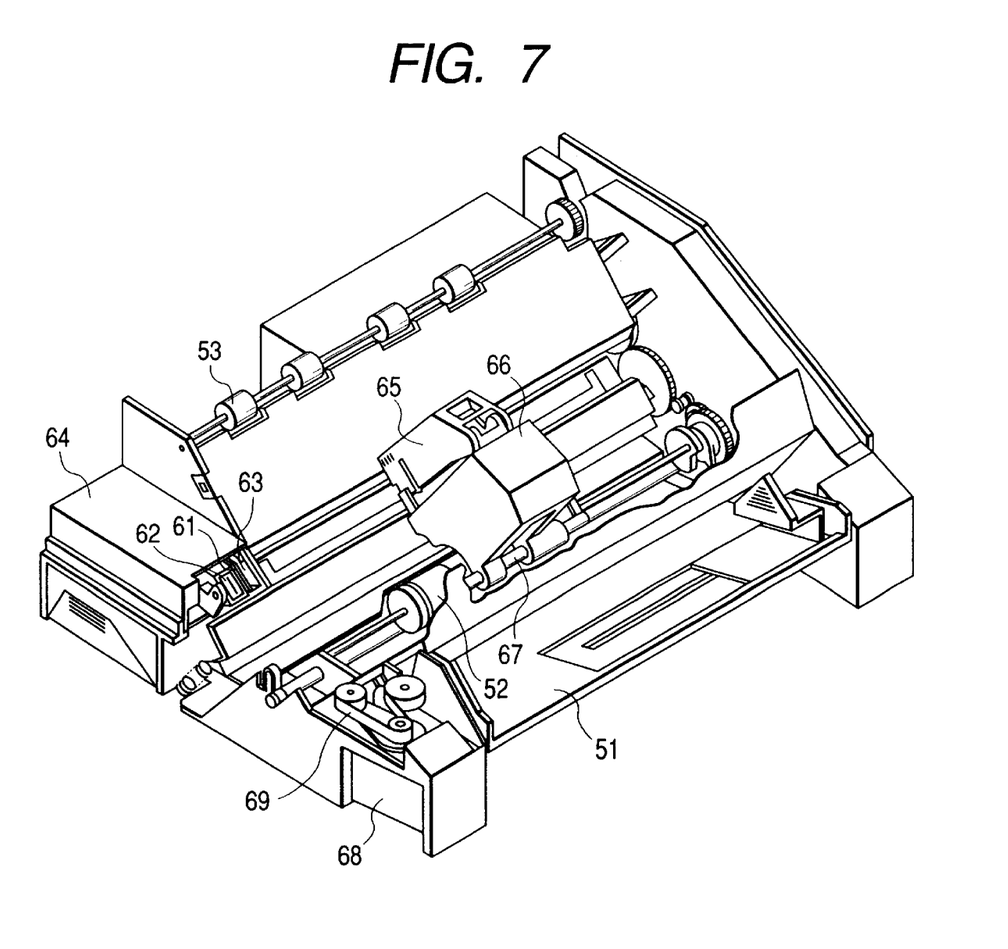
FIG. 7 is a perspective view of an ink-jet recording apparatus of the present invention employing the ink-jet head.

FIG. 7 shows an example of the entire appearance of the ink-jet recording apparatus equipped with such a head. This apparatus is a typical example of the ink-jet printer. The principle of the ink-jet recording on the electronic blackboard is explained by reference to this apparatus. In the explanation below, the "recording medium" corresponds to the display medium of the present invention.

In FIG. 7, a blade 61 as a wiping member is held at one end of the blade by a blade-holding member, forming a fixed end in a shape of a cantilever. The blade 61 is placed at a position adjacent to the recording region of the recording head, and is held, in this example, so as to protrude into the moving path of the recording head. A cap 62 for capping the projected opening face is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head 65 in a manner similar to that of the blade 61. The blade 61, the cap 62, and the ink absorbent 63 remove water, dust, and the like from the face of the ink ejection nozzle.

A recording head 65 has an energy-generating means for the ejection and conducts recording by ejecting the ink onto a recording medium opposing to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper sheet delivery device 51 for delivery of a recording medium and a paper sheet delivery roller 52 driven by a motor (not shown in the drawing) delivers a recording medium to the position opposing to the ejection nozzle face of the recording head. With the above constitution, the recording medium is delivered to the front of the ejection orifice of the recording head 65 with the progress of the recording, and is delivered further to a paper discharge device provided with paper sheet-discharging rollers 53.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejecting nozzle face of the recording head 65 is wiped. To cap the ejection face of the recording head 65, the cap 62 protrudes toward the moving path of the recording head to come into contact with the ejection nozzle face. When the recording head 65 is moved from the home position to the record-starting position, the cap 62 and the blade 61 are at the same position as in the above-mentioned wiping step, so that the ejection nozzle face of the recording head 65 is wiped also in this movement.

The recording head 65 is moved to the home position not only at the completion of the recording and at the time of ejection recovery, but is moved also at predetermined time intervals during recording from the recording region. The nozzle is wiped by this movement.

Figure 8:
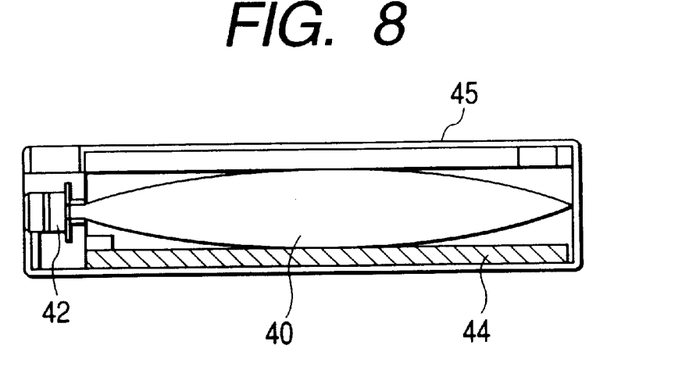
FIG. 8 is a sectional view of an ink cartridge used in the present invention containing an ink to be fed to the ink-jet head.

FIG. 8 is a sectional view of an example of an ink cartridge 45 which holds an ink to be supplied through an ink supplying member such as a tube. An ink container 40, for example, an ink bag, contains an ink to be supplied, and has a rubber plug 42 at the tip. Insertion of a needle (not shown in the drawing) into the plug 42 enables supply of the ink from the ink bag 40 to the head. A waste-ink absorbent 44 serves to absorb waste ink. The liquid-contacting face of the ink container is preferably formed of polyolefins, especially polyethylene, in the present invention.

The ink-jet recording apparatus used in the present invention is not limited to the above-mentioned one which has separately a head and an ink cartridge 45. Integration thereof as shown in FIG. 9 may suitably be employed.

Figure 9:
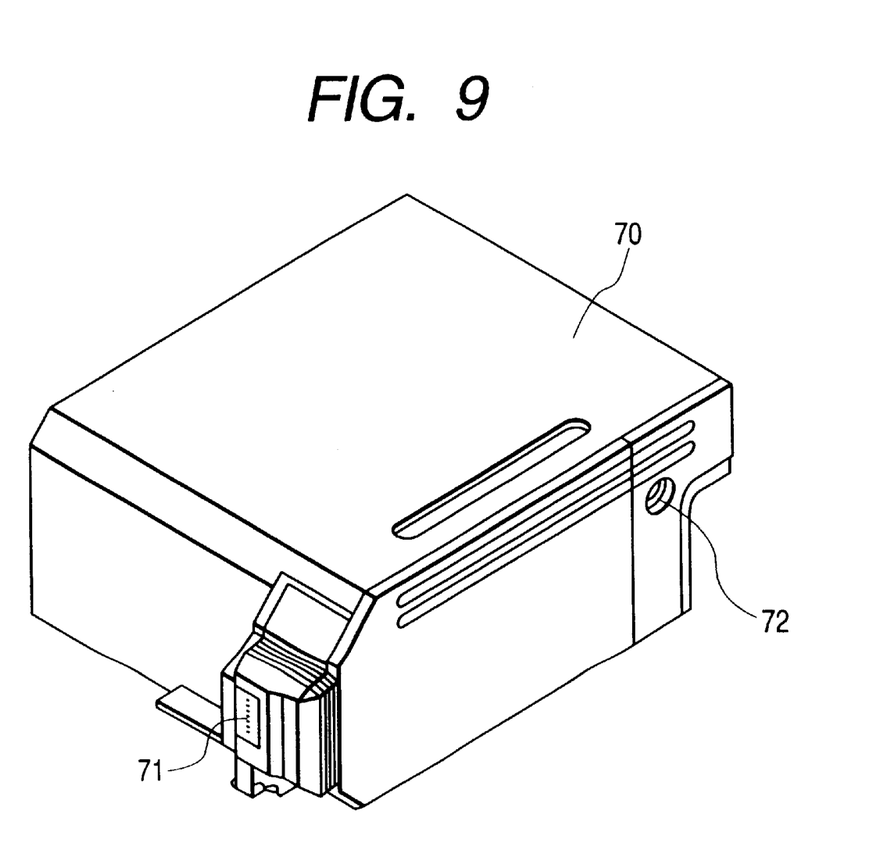
FIG. 9 illustrates an ink-jet recording unit used in the present invention having a head and an ink cartridge in integration.

In FIG. 9, a recording unit 70 houses an ink holding member such as an ink absorbent, and the ink in the absorbent is ejected through plural orifices of a head 71. An air communication hole 72 allows the interior of the recording unit to communicate with the open air. This recording unit 70 is used in place of the recording head shown in FIG. 4, and is detachable from the carriage 66.

The above description by reference to FIGS. 4 to 9 explains the principle of the conventional ink-jet recording apparatus. The aforementioned electronic blackboard employs display medium 2 shown in FIGS. 1A to 1D and FIGS. 2A to 2D in place of the above-described recording medium.

Ink

The color ink used for the aforementioned electronic blackboard contains preferably a polymer emulsion to obtain the fixability of the ink on application onto the display medium, and is preferably a pigment ink employing a pigment as a coloring agent to make the image erasable or wipeable. The polymer emulsion contained in the ink allows the ink drops to adhere strongly to the surface of the display medium to prevent running or diffusion of the ink, causing no bleeding of the image.

The polymer emulsion for the ink may be any dispersion of a nonwater-soluble polymer in an aqueous liquid medium mainly composed of water. Of the emulsions, preferred are acrylic polymer emulsions and vinyl acetate type polymer emulsions as mentioned later. In contrast, a water-soluble polymer added to the ink raises the viscosity to cause ejection failure, so that the content of water-soluble polymer is limited to be in a small amount. The emulsion of the polymer does not raise the viscosity of the ink so much, even at a higher concentration, not causing the ejection failure.

The polymer emulsion incorporated into the ink will cause effectively the interaction between the ink and the hydrophobic surface of the display medium immediately after the printing to promote adsorption of the ink on the display medium. The power of this adsorption is extremely low. However, the polymer in the emulsion having a glass transition temperature of 0° C. or lower (according to a differential scanning calorimeter) prevents flow of the image before the drying of the ink liquid medium by the adhesion force of the polymer under normal application conditions, effectively. Further, with evaporation of the liquid medium, the emulsion polymer particles come into contact with each other to form a film to increase the fixability of the ink. This film formation also contributes to improve the erasability. The high fixability of the above ink is presumed to be due to the above reasons.

The ink containing the acrylic polymer emulsion or the vinyl acetate polymer emulsion is ejectable through the ink-jet nozzle and simultaneously gives high print fixability and high image erasability. For preventing effectively the image running or bleeding caused by insufficient initial fixability and preventing the ejection failure caused by ink viscosity rise, the emulsion is contained at a content ranging from 0.001% to 0.5% by weight, more preferably from 0.01% to 0.2% by weight based on the total weight of the color ink.

The source monomer for the above emulsion polymer includes vinyl acetate; (meth)acrylate esters of $C_{1-30}$ alkyl or cycloalkyl such as methyl (meth)acrylate, ethyl (meth) acrylate, n-propyl (meth)acrylate, isopropyl (meth)acrylate, n-butyl (meth)acrylate, isobutyl (meth)acrylate, t-butyl (meth)acrylate, hexyl (meth)acrylate, 2-ethylhexyl (meth) acrylate, n-octyl (meth)acrylate, decyl (meth)acrylate, lauryl (meth)acrylate, stearyl (meth)acrylate, and cyclohexyl (meth)acrylate; (meth)acrylate esters of $C_{2-18}$ alkoxyalkyl such as trimethoxybutyl (meth)acrylate, methoxyethyl (meth)acrylate, and ethoxybutyl (meth)acrylate; and (meth) acrylate esters of $C_{2-18}$ hydroxyalkyl such as 2-hydroxyethyl (meth)acrylate, hydroxypropyl (meth)acrylate, and hydroxybutyl (meth)acrylate.

Usually, copolymers are used which are produced from the above monomers by copolymerization in a suitable monomer ratio. The mixture of the homopolymers of the above monomers, or the mixture of the above copolymers may be used. With the above monomer, preferably an anionic monomer, a nonionic hydrophilic monomer, or a cationic monomer is copolymerized. Thereby the resulting copolymer becomes hydrophilic to serve as an emulsifier, improving dispersion stability of the emulsion itself and the pigment, and reducing the amount of the necessary dispersant such as a surfactant and a hydrophilic polymer. Consequently, the ejection properties of the ink and the fixability of the ink to the display medium are advantageously improved.

The anionic monomer includes (meth)acrylic acid, maleic anhydride, itaconic acid, and sodium styrenesulfonate. The nonionic monomer includes above monomers having a hydroxyl group, or an ether bond as above. The cationic monomer includes dimethylaminoethyl (meth)acrylate, diethylaminoethyl (meth)acrylate, dimethylaminopropyl (meth)acrylamide, vinylimidazole, vinylpyridine, vinylpyrrolidone, and vinylsuccinimide, and quaternary compounds thereof. These ionic monomers may be used in a small amount not to make the resulting copolymer substantially soluble in the liquid medium of the ink.

Further, in the copolymerization, there may be added a crosslinkable monomer such as divinyl compounds, polyvalent (meth)acrylate compounds, diene compounds, dihydrodicyclopentadienyl-group-containing (meth)acrylate esters, and epoxy-group-containing ethylenically unsaturated compounds; aziridine type crosslinking agents; block type or self-emulsifiable type isocyanate crosslinking agents; carbodiimide type crosslinking-agents; and metal type crosslinking agents.

The process for polymerization of the above monomers for producing the base polymer of the emulsion includes solution polymerization, ultraviolet (UV) polymerization, emulsion polymerization, and suspension polymerization, but is not limited thereto. The initiator for the above polymerization includes persulfate salts such as potassium persulfate, and ammonium persulfate; water-soluble azo compounds such as azobiscyanovaleric acid; and redox type initiators such as combination of hydrogen peroxide or the like with a reducing agent, but is not limited thereto. The initiator is used in an amount ranging from 0.01 to 1 parts by weight based on 100 parts by weight of the monomer. The resulting emulsion base polymer has a weight-average molecular weight preferably ranging from several tens of thousands to several hundreds of thousands in view of the suitable adhesiveness of the ink to the display medium.

In preparation of the aforementioned polymer emulsion, an emulsifier may be used. The emulsifier includes anionic emulsifiers such as dodecylbenzenesulfonates, alkyl sulfate salts, and polyoxyethylene alkylphenyl ether sulfonate salts; and nonionic emulsifiers such as polyoxyethylene alkylphenyl ethers, and polyoxyethylene alkyl ethers, but is not limited thereto.

The polymer emulsion may contain a tackifier resin. The tackifier resin includes rosin type tackifier resins such as gum rosins, tall oil rosins, wood rosins, polymerized rosins, hydrogenated rosins, disproportionated rosins, rosin esters, polymerized rosin esters, hydrogenated rosin esters, disproportionated rosin esters, and rosin-modified phenol resins; and terpene resins, hydrogenated terpene resins, phenol resins, terpene phenol resins, hydrogenated terpene phenol resins, xylene resins, aliphatic petroleum resins, alicyclic petroleum resins, aromatic petroleum resins, coumarone resins, and styrene resins. To the polymer emulsion, there may be added still another additive such as an antioxidant, a light stabilizer, a fungicide, and a coloring agent, as necessary.

As described before, the emulsion containing a polymer having a glass transition temperature of not higher than 0° C. as measured by a differential scanning calorimeter gives satisfactory adhesiveness, and gives satisfactory fixability of the ink onto the display medium. Out of the commercial polymer emulsions, the ones having the glass transition temperature (Tg) of not higher than 0° C. are, for example, NX148 (Tg: −49° C.) and NX149 (Tg: −45° C.) produced by Mitsubishi Rayon Co.); SK Dine AN49B (Tg: −48° C.), SK Dine E03H (Tg: −69° C.) and SK Dine RE330 (Tg: −78° C.) produced by Soken Kagaku K.K.; and Teisan Resin A3611 (Tg: −32° C.), Teisan Resin NFA369TB (Tg: −35° C.), and Teisan Resin NFA370N (Tg: −32° C.) produced by Teikoku Kagaku Sangyo K.K.

The aforementioned polymer emulsion also serves as a dispersant for the pigment in the color ink. Further, a surfactant or a hydrophilic resin is preferably employed as a dispersant for the pigment. The hydrophilic resin has a weight-average molecular weight preferably ranging from 1,000 to 30,000, more preferably from 3,000 to 15,000, but is not limited thereto. The resin specifically includes block copolymers, graft copolymers, and random copolymers, and the salts thereof produced from two or more monomers including at least one hydrophilic monomer selected from the group consisting of styrene and derivatives thereof, vinylnaphthalene and derivative thereof, α,α-ethylenically unsaturated carboxylic acid esters of aliphatic alcohols, (meth)acrylic acid and derivative thereof, maleic acid and derivatives thereof, itaconic acid and derivatives thereof, fumaric acid and derivative thereof, and so forth.

The resin is preferably an alkali-soluble resin which is insoluble in an acidic or neutral liquid medium but is soluble in an aqueous solution containing a base dissolved therein. The alkali-soluble type resin, which is practically insoluble in the liquid medium of the ink, enables decrease of the viscosity of the ink, and facilitates the dispersion of the pigment, advantageously. The resin may be a homopolymer or a salt thereof constituted of a hydrophilic monomer. Another hydrophilic resin such as a polyvinyl alcohol, a carboxymethylcellulose, and a naphthalenesulfonic acid-formaldehyde condensate may be used in such an amount as not to cause excessive rise of the viscosity of the ink.

Furthermore, for improvement of the density of print with the ink, the hydrophilic resin is preferred which begins to coagulate at pH 6 or lower. Such a hydrophilic resin is contained in the color ink in an amount preferably ranging from 0.1% to 5% by weight based on the total weight of the color ink. Incidentally, since the aforementioned hydrophilic resin is in a dispersion state in the pigment ink, the pigment ink containing the hydrophilic resin has a viscosity lower than that of the dye ink containing the same resin and can be ejected suitably through the ink-jet nozzle.

As a marking-pen ink for the whiteboard, pigment inks are generally used utilizing the low abrasion resistance, or high erasability, and are erasable with an erasing device. The conventional pigment ink has disadvantages for ink-jet ink in dispersion stability and ejection stability. However, the pigment dispersibility of the pigment ink is improved by addition of the above polymer emulsion.

For achieving satisfactory color reproduction with the ink-jet ejection properties (viscosity, and scorch resistance in a bubble jet system) kept well, the pigment for each of the colors of yellow, magenta, cyan, and black is contained in an amount preferably ranging from 1% to 10% by weight, more preferably from 5% to 8% by weight based on the total weight of the respective inks, the contents being adjusted in consideration of the spectral reflection densities, the color balance, and the print density.

The carbon black used for the black ink includes those produced by a furnace process, a channel process, or a like process, preferably having the properties: primary particle diameter of 15 to 40 μm, BET specific surface area of 50 to 300 m$^2$/g, DBP absorptivity of 40 to 150 mL/100 g, volatile matter content of 0.5 to 10%, and pH of 2 to 9. The commercial products having such properties include No.2300, No.900, MCF88, No.33, No.40, No.45, No.52, MA7, MA8, and No.2200B (produced by Mitsubishi Chemical Co.); RAVEN 1255 (Produced by Columbia Co.); REGAL 400R, REGAL 330R, REGAL 660R, and MOGUL L (produced by Cabot Co.); and Color Black FW1, Color Black FW18, Color Black S170, Color Black S150, Printex 35, and Printex U (produced by Degussa Co.).

The yellow pigment for the yellow ink includes C.I. Pigment Yellows 1, 2, 3, 13, 16, and 83. The magenta pigment for the magenta ink includes C.I. Pigment Reds 5, 7, 12, 48(Ca), 48(Mn), 57(Ca), 112, and 122. The cyan pigment for the cyan ink includes C.I. Pigment Blues, 1, 2, 3, 15:3, 16, and 22; and C.I. Vat Blues 4, and 6.

For stable ejection of the pigment ink containing the polymer emulsion by an ink-jet method, a glycol and/or an alcohol is added to the pigment ink to adjust the moisture-retaining property of the ink before ejection and the surface tension immediately after the printing.

The glycol is contained at a content preferably ranging from 0 to 10% by weight, more preferably from 2% to 8% by weight, and the alcohol is contained at a content preferably ranging from 0 to 20% by weight, more preferably from 2% to 10% by weight based on the total weight of the color ink. Since glycols and alcohols can give similar effects to the ink as understood from the molecular structures, the addition of either one of the glycol and the alcohol may be omitted.

The glycol is preferably selected from alkylene glycols of 2–6 carbons, including ethylene glycol, propylene glycol, butylene glycol, diethylene glycol, triethylene glycol, 1,2, 6-hexanetriol, thiodiglycol, and hexylene glycol.

The alcohol is preferably selected from alcohols of 1–4 carbons, including methyl alcohol, ethyl alcohol, n-propyl alcohol, isopropyl alcohol, n-butyl alcohol, sec-butyl alcohol, and t-butyl alcohol.

For improving the affinity of the hydrophilic resin to the medium and for high long-term storability of the ink, the color ink is adjusted to be neutral or alkaline as a whole. For keeping the ink viscosity to be optimum and for improving the durability of the parts of the ink-jet recording apparatus, the pH of the color ink is adjusted preferably to be in the range of from 7 to 10. The pH adjusting agent includes organic amines such as diethanolamine, and triethanolamine; alkali metal hydroxides such as sodium hydroxide, lithium hydroxide, and potassium hydroxide; organic acids; and inorganic acids.

The suitable liquid medium of the color ink includes water, and mixtures of water and a water-soluble organic solvent. The water is preferably ion-exchanged water (deionized water). A water-soluble organic solvent such as a polyhydric alcohol or its alkyl ether may be added to the water.

The polyhydric alcohol and its alkyl ether includes polyalkylene glycols such as polyethylene glycol, and polypropylene glycol; glycerin; lower alkyl ethers of polyhydric alcohols such as ethylene glycol monomethyl (or monoethyl) ether, diethylene glycol monomethyl (or monoethyl) ether, and triethylene glycol monomethyl (or monoethyl) ether.

The main constituents of the color ink are described above. Another additive may be added, if necessary, including urea, a water-soluble organic solvent, a surfactant, a pH adjusting agent (mentioned above), an antifoaming agent, and an antiseptic. The usable water-soluble organic solvent except those mentioned above includes amides such as dimethylformamide, and dimethylacetamide; ketones and ketoalcohols such as acetone, and diacetone alcohol; ethers such as tetrahydrofuran, and dioxane; N-methyl-2-pyrrolidone; and 1,3-dimethyl-2-imidazolidinone.

The surfactant includes anionic surfactants such as fatty acid salts, higher alcohol sulfate ester salts, liquid fatty oil sulfate ester salts, and alkylarylsulfonate salts; and nonionic surfactants such as polyoxyethylene alkyl ethers, polyoxyethylene alkyl esters, and polyoxyethylene sorbitan alkyl esters. The surfactant may be used singly or in combination of two or more thereof. The amount of the surfactant preferably ranges from 0.01% to 5% by weight based on the total weight of the color ink.

In ink ejection in ink-jet system, for more precise control of the impact point of the ink to achieve a higher image quality, the amount of the surfactant is selected to obtain the surface tension of the color ink to be not lower than 35 mN/m (dyn/cm).

A preferred example of preparation of the color ink is shown below without limiting the present invention.

The hydrophilic resin is dissolved completely in distilled water by heating to 70° C. In dissolving the resin, since at low concentration of the resin the solution can be nonuniform, the resin is dissolved once at a high concentration, and then is diluted to the desired concentration of the resin preferably. A surfactant may be used in place of the hydrophilic resin.

To this solution, a pigment and an alcohol like ethanol are added, and mixed preliminarily. This mixture is subjected to dispersion treatment. The dispersion is conducted by any of conventional dispersion machines. The machine includes ball mills employing ceramic balls or steel balls, roll mills, and sand mills employing glass beads or ceramic beads. Of the mills, a high-speed sand mill is preferred, such as Super Mill, Sand Grinder, Beads Mill, Agitator Mill, Gren Mill, Daino Mill, Pearl Mill, and Cobol Mill (trade names). The beads for the sand mill may be glass beads, ceramic beads, zirconium beads, or the like having a particle diameter ranging from 1 mm to 1.5 mm.

The dispersion treatment is conducted preferably under the conditions below.

Dispersion machine: Sand Grinder (manufactured by Igarashi Kikai K.K.)

Grinding medium: Glass beads or zirconium beads (1 mm diameter)

Packing ratio of grinding medium: 50% by volume Grinding time: 3 to 4 hours

After the dispersion treatment under the above-mentioned conditions, the dispersion was further subjected to centrifugation (preferably, rotation speed: 12,000 rpm, and treatment time: 15 to 20 minutes) to remove the coexisting coarse particles to obtain a dispersion liquid containing the pigment with a particle diameter of 100 nm to 200 nm. As the dispersion machine, Pearl Mill (manufactured by Ashizawa K.K., ejection speed: 100 mL/min) may be used.

For effective dispersion treatment and the optimum dispersion state of the pigment, the total amount of the pigment and the hydrophilic resin preferably ranges from 5% to 30% by weight, more preferably from 10% to 30% by weight based on the total weight of the dispersion liquid.

To this liquid dispersion, are added a polymer emulsion, an aqueous organic solvent, ion-exchanged water, and so forth, and then the mixture is stirred for about one hour. For obtaining a pigment having a desired particle size distribution, various measures can be taken: smaller size of the grinding medium, higher packing ratio of the grinding medium, prolongated treatment time, lower ejection speed, classification of the particles by filtration or centrifugation, and combinations of the above measures.

In another method, instead of mixing the polymer emulsion to the pigment dispersion, the source monomer may be mixed directly and stirred, and polymerization is allowed to proceed in that state.

The color ink is prepared in the above procedure.

In the above embodiment of the erasing-device-equipped image display apparatus, the image recording means is not essential. For example, the present invention covers the situation in which an image is written by hand with a marking-pen with the aforementioned color ink, and the hand-written image is erased by the image erasing device of the present invention.

Ink-Jet Printer

One embodiment of the erasing device-equipped image recording apparatus is an ink-jet printer.

Figure 11:
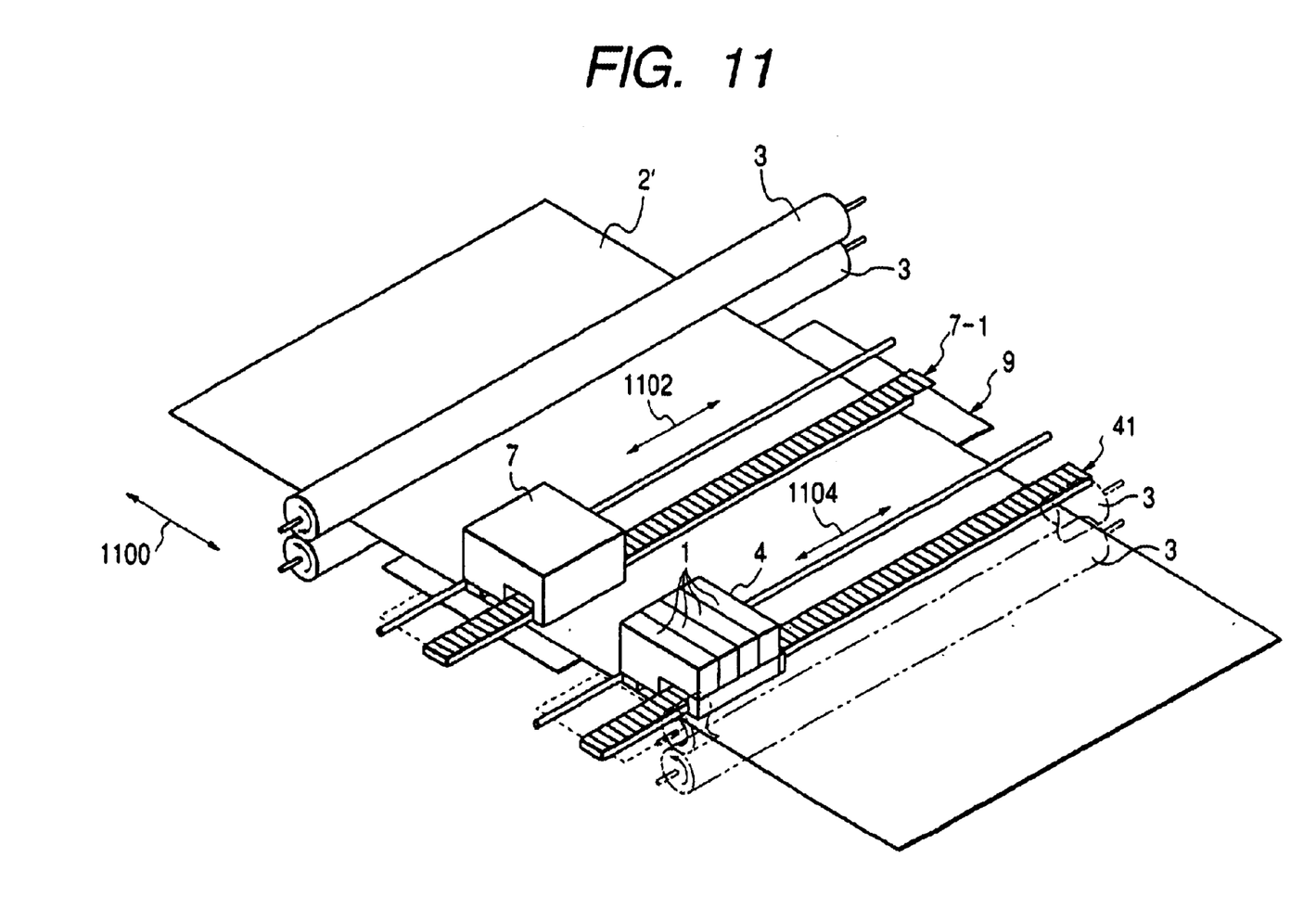
FIG. 11 shows the constitution of an ink-jet printer of the present invention.
Figure 12:
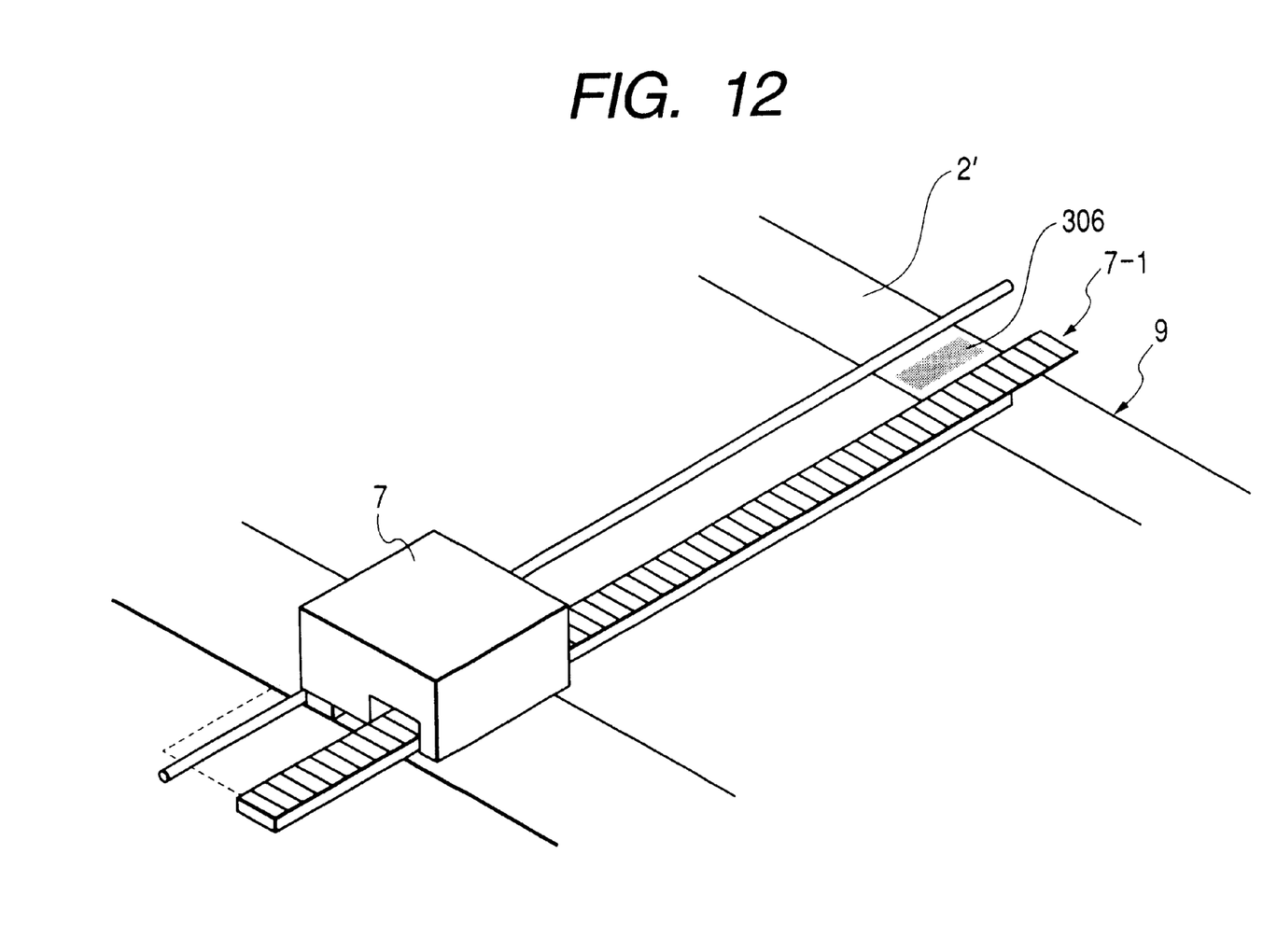
FIG. 12 is a drawing explaining the erasing operation of an ink-jet printer of the present invention.

FIG. 11 illustrates an example of the ink-jet printer.

In FIG. 11 the ink-jet printer comprises at least an ink cartridge 1, a sheet-shaped nonpenetrable recording medium 2', a feeding means 3 for the recording medium, and ink-jet head 4, a driving means 41 for the ink-jet head, an ink-feeding means (not shown in FIG. 11 because the ink-jet head and the ink tank are integrated into an ink cartridge), a cleaner 7, and a cleaner driving means 7-1. In this ink-jet printer, the scanning direction 1104 of the ink-jet head 4 and the scanning direction 1102 of the cleaner 7 are respectively perpendicular to the feeding direction 1100 of the recording medium 2'; recording medium 2' is fed stepwise; and the ink-jet head 4 and the cleaner 7 are allowed to scan while the recording medium 2' stays stationary.

The recording medium is fed stepwise in the prescribed direction by a conventional recording medium-feeding means of the printer. The cleaner is disposed in front of the ink-jet head in terms of the aforementioned feeding direction at a position convenient for maintenance. The ink-jet head 4 is disposed behind the cleaner 7 in terms of the aforementioned feeding direction at a position convenient for maintenance.

The recording medium for the apparatus of the present invention is preferably a nonpenetrable sheet (cut sheets or roll sheets), and the material thereof may be the same as that of the display medium of the aforementioned electronic blackboard. The cleaner, the ink, the ink-jet head, and other parts may be the same as those employed in the aforementioned electronic blackboard.

The embodiment of the image recording apparatus of the present invention is described above. The present invention is not limited to those described above. The recording medium need not belong to the apparatus. The recording means is not limited to the ink-jet system, but may be hand writing, or other means.

The present invention relates to a device for erasing an image formed erasably on a display medium or a recording medium, the device comprising a means for feeding the medium stepwise, and a cleaner for erasing the image formed on the recording medium by independently scanning the cleaner perpendicularly to the direction of feeding of the medium while the medium stays stationary.

EXAMPLES

The present invention is described more specifically by reference to examples. The units "parts" and "%" are based on weight unless otherwise mentioned.

Examples 1 to 3 relate to an electronic blackboard as the erasing-device-equipped image display apparatus, and Example 4 relates to an ink-jet printer as the erasing-device-equipped image recording apparatus.

Preparation of Color Inks

[Black Ink]

Preparation of Pigment Liquid Dispersion

| Styrene/acrylic acid/butyl acrylate copolymer (Acid value: 116, Mw: 3,700) | 1.5 parts |
|---|---|
| Monoethanolamine | 1.0 part |
| Deionized water | 81.5 parts |
| Diethylene glycol | 5.0 parts |

The above components were mixed, and the resin component was completely dissolved by heating to 70° C. To this solution, were added 10.0 parts of a newly developed carbon black (MCF88, produced by Mitsubishi Chemical Co.), and 1.0 part of isopropyl alcohol. The mixture was preliminarily mixed, and was treated to obtain dispersion under the conditions below.

Dispersion machine: Sand Grinder (manufactured by Igarashi Kikai K.K.)

Grinding medium: Zirconium beads (1 mm diameter)

Packing ratio of grinding medium: 50% by volume

Grinding time: 3 hours

After the dispersion treatment, the dispersion liquid was further subjected to centrifugation (12,000 rpm, 20 minutes) to remove coarse particles to obtain the liquid dispersion.

Preparation of Ink

| Above liquid dispersion | 10.0 parts |
|---|---|
| Teisan Resin 370N (50% polymer content emulsion) | 0.2 part |
| Propylene glycol | 5.0 parts |
| Isopropyl alcohol | 10.0 parts |
| Deionized water | 74.8 parts |

The above components were mixed, and the pH of the mixture was adjusted to be in the range of pH 8–10 to obtain the black ink.

The resulting black ink contains 1.0% of the pigment, 0.1% of the emulsified polymer, 5.5% of the glycol (propylene glycol), and 10.0% of the alcohol (isopropyl alcohol). The same mixing ratio was selected in the color inks below. Teisan Resin 370N is an acrylic polymer emulsion, and the glass transition temperature of the polymer is –32° C.

[Yellow Ink]

The yellow ink was prepared in the same manner as in preparation of the above black ink except that the pigment carbon black was replaced by C.I. Pigment Yellow 13.

[Magenta Ink]

The magenta ink was prepared in the same manner as in preparation of the above black ink except that the pigment carbon black was replaced by C.I. Pigment Red 7.

[Cyan Ink]

The cyan ink was prepared in the same manner as in preparation of the above black ink except that the pigment carbon black was replaced by C.I. Pigment Blue 22.

Figure 10:
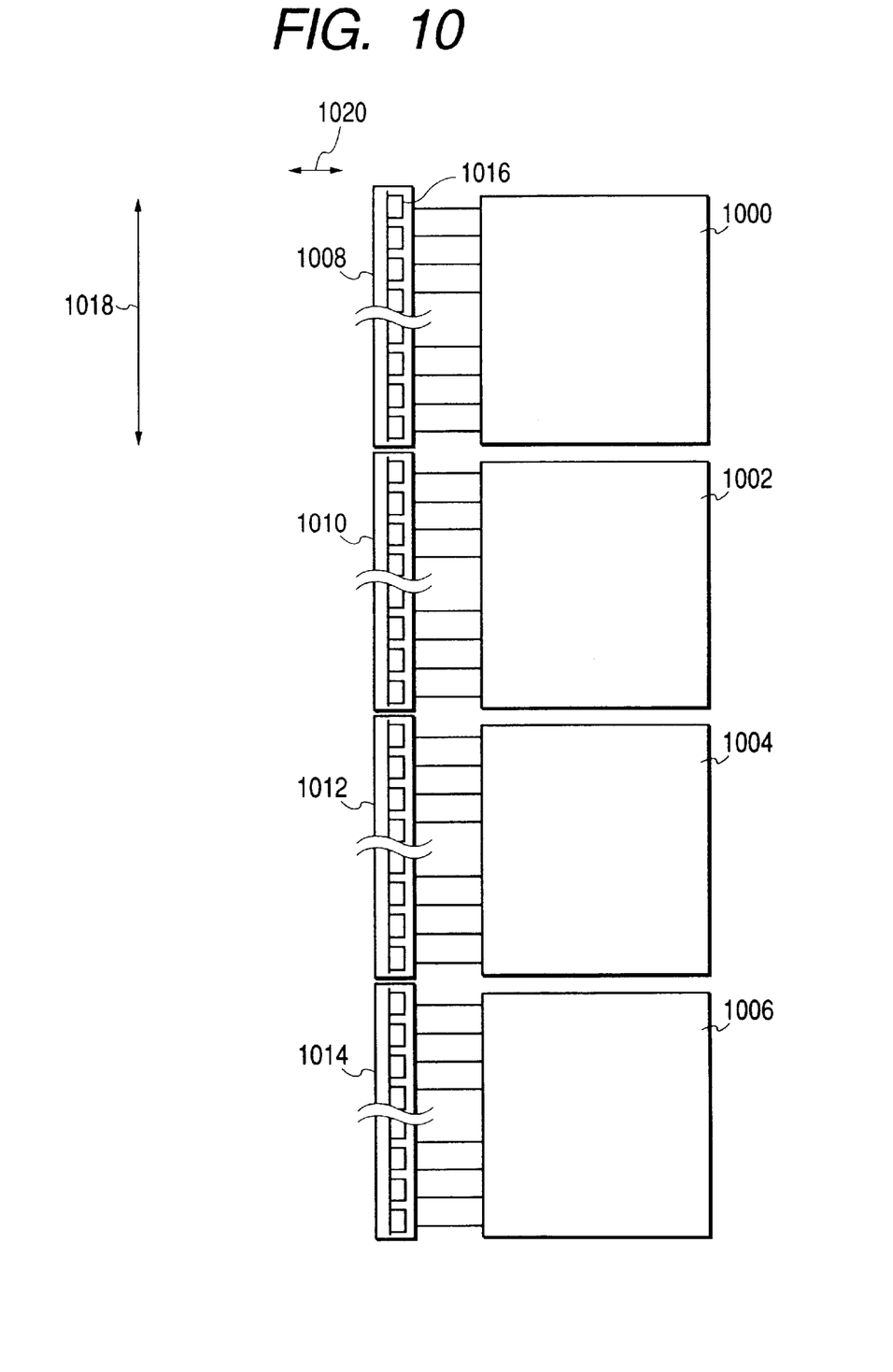
FIG. 10 shows the constitution of connection of four-color ink cartridges and a multi-head.

The four color inks prepared above were introduced into the ink cartridges respectively. These ink cartridges were connected through an ink feeding means to ink heads as shown in FIG. 10. A display medium used was made of a polyethylene terephthalate film of an endless belt shape hard-coated with an acrylic resin. This displaying film was supported by two rollers with tension, and was fed by rotation of the rollers. An image was formed thereon by ejecting the inks in the order of black, cyan, magenta, and yellow as shown before.

In the vertically oblong electronic blackboard shown in FIGS. 1A to 1D, the display medium had a width of 914 mm, the lateral length of the display area was 800 mm, and the vertical length of the display area was 1,000 mm. The stationary time of the display medium was set to 10 seconds, the feeding speed of the display medium was 100 m/second/line (=200 mm/sec), and the display medium was fed stepwise intermittently. The ink-jet head nozzle had a side length of 50 $\mu$m; the dot diameter immediately after printing was about 80 $\mu$m; the nozzle pitch was 200 $\mu$m; 80 nozzles were employed for one color per head; the ink-jet head pitch of the respective colors (pitch for one line) was 20 mm; and the scanning velocity of the ink-jet head was 100 mm/sec. The printing was conducted on the stationary display medium by forward-backward movement of the head. The printing over the entire display area took about 8 minutes. Each of the color pigment inks became dry to be fixed substantially onto the display medium during about 10 seconds before overprinting of the next color of the pigment, giving an excellent color image without bleeding.

The above color image was wiped with the erasing device having the constitution shown in FIG. 3, which employs a cleaner having on the surface a felt of the same material as the whiteboard erasing device and copying plain paper as a waste ink absorbing member. Thereby, the ink image was erased, and was transferred as a waste ink 306 onto the waste ink absorbing member. The image was almost completely erased from the display medium. The cleaner was driven to scan while the display medium stays stationary at a scanning rate of 100 mm/sec. The cleaner was in a size of 30 mm×30 mm (pitch of one line: 20 mm).

Example 2

Four color inks were prepared in the same manner as in Example 1 except that the polymer emulsion in Example 1 was replaced by 0.1 part of NX-148 (acrylic polymer emulsion produced by Mitsubishi Rayon Co., Tg: –49° C). With these inks, in the same manner as in Example 1, a color image was formed on the electronic blackboard; the image was erased; and another image was formed again. The result was satisfactory as in Example 1.

Example 3

Four color inks were prepared in the same manner as in Example 1 except that the polymer emulsion in Example 1 was replaced by 0.1 part of SK Dyne AN-49B (acrylic polymer emulsion produced by Soken Kagaku K.K., Tg: –48° C.). With these inks, in the same manner as in Example 1, a color image was formed on the electronic blackboard; the image was erased; and another image was formed again. The result was satisfactory as in Example 1 and Example 2.

Example 4

The inks of black, cyan, magenta, and yellow prepared in Example 1 were respectively introduced into the ink cartridges 1000, 1002, 1004, and 1006. The ink cartridges were respectively connected to the ink-jet head 1008, 1010, 1012, and 1014 as shown in FIG. 10. An A4-sized display medium made of an acrilic-resin-hard-coated polyethylene terephthalate film was supported by two rollers with tension, and was fed in the direction 1018. Thereon, an image was formed in the order of colors of black, cyan, magenta, and yellow.

The stationary time of the display medium was set to 10 seconds; the delivery speed of the display medium was 100 m/second/line (=200 mm/sec); and the display medium was fed stepwise intermittently. The ink-jet head nozzle 1016 had a side length of 50 µm; the dot diameter immediately after the printing was about 80 µm; the nozzle pitch was 200 µm; 80 nozzles were employed for one color per head; the pitch of the ink-jet head of the respective colors (pitch for one line) was 20 mm; and the scanning velocity of the ink-jet head was 100 mm/sec. The printing was conducted on the stationary display medium by forward-backward movement of the head in the direction 1020. The printing over the entire displaying area took about 8 minutes. Each of the color pigment inks became dry to be fixed substantially onto the display medium in about 10 seconds before overprinting of the next color of the pigment to give an excellent color image without bleeding.

The printed recording medium was fed again to the ink-jet printer. Another printing was conducted after erasing the last printed image. The printing and the erasure were repeated several tens of times, and excellent images were obtained steadily.

EFFECTS OF THE INVENTION

The present invention provides an image display apparatus equipped with a feeding means for a display medium, and also equipped with a means for steadily erasing the printed image on the display medium.

What is claimed is:

1. An image display apparatus having a function of erasing an image, comprising:

a display medium;

means for feeding the display medium stepwise;

a cleaner for erasing an image formed on the display medium by independently scanning the cleaner perpendicularly to the direction of feeding of the display medium while the cleaner is in contact with the display medium and the display medium stays stationary; and image forming means for forming an image on the display medium by scanning the image forming means independently of the cleaner and perpendicularly to the direction of feeding of the display medium while the display medium stays stationary.

2. The image display apparatus according to claim 1, wherein a waste-ink-absorbing member is positioned behind the display medium for contact with the cleaner.

3. The image display apparatus according to claim 2, wherein the waste-ink-absorbing member has a wider width than that of the display medium, and the cleaner is so designed as to start scanning from one end of the width of the display medium and pass through the other end thereof to stop on the waste-ink-absorbing member.

4. The image display apparatus according to claim 1, wherein the display medium is nonpenetrable.

5. The image display apparatus according to claim 1, wherein the display medium is in a shape of a belt.

6. The image display apparatus according to claim 1, further comprising, as the image forming means, an ink-jet head for applying an ink to the display medium, scanning means for the ink-jet head, an ink cartridge for holding the ink, and ink-supplying means.

7. The image display apparatus according to claim 6, comprising a plurality of ink-jet heads for a plurality of colors, and the respective ink-jet heads are arranged in line with the feeding direction of the display medium.

8. The image display apparatus according to claim 6, wherein a plurality of ink-jet heads are integrated in one body, and respective nozzles are arranged at an interval twice or more the diameter of ink droplets.

9. The image display apparatus according to claim 6, further comprising a means for thinning out picture elements when a density of a shot-in ink for an image to be formed on the display medium exceeds a predetermined level.

10. The image display apparatus according to claim 6, further comprising a means for thinning out ink ejection when a density of a shot-in ink for an image to be formed on the display medium exceeds a predetermined level.

11. The image display apparatus according to claim 6, wherein an ink for use therein contains a pigment of one color selected from yellow, magenta, cyan, and black at a content ranging from 1% to 10% by weight, a polymer emulsion at a content ranging from 0.001% to 0.5% by weight, a glycol at a content ranging from 0% to 10% by weight, and an alcohol at a content ranging from 0% to 20% by weight based on the total weight of the ink.

12. The image display apparatus according to claim 1, wherein the polymer emulsion is an acrylic polymer emulsion or a vinyl acetate polymer type emulsion.

13. The image display apparatus according to claim 11, wherein the polymer in the polymer emulsion has a glass transition temperature of not higher than 0° C. as measured by a differential scanning calorimeter.

14. The image display apparatus according to claim 11, wherein the glycol is ethylene glycol or propylene glycol.

15. The image display apparatus according to claim 11, wherein the alcohol is selected from aliphatic alcohols of 1–6 carbons.

16. The image display apparatus according to claim 1, wherein the cleaner wipes off the image from the display medium and holds ink from the image.

17. An image recording apparatus having a function of erasing an image, comprising:

means for feeding a recording medium stepwise;

a cleaner for erasing the image formed on the recording medium by independently scanning the cleaner perpendicularly to the direction of feeding of the recording medium while the cleaner is in contact with the recording medium and the recording medium stays stationary; and image recording means for recording an image on the recording medium by scanning the image recording means independently of the cleaner and perpendicularly to the direction of feeding of the recording medium while the recording medium stays stationary.

18. The image recording apparatus according to claim 17, wherein a waste-ink-absorbing member is positioned behind the recording medium for contact with the cleaner.

19. The image recording apparatus according to claim 18, wherein the waste-ink-absorbing member has a wider width than that of the recording medium, and the cleaner is so designed as to start scanning from one end of the width of the recording medium and pass through the other end thereof to stop on the waste-ink-absorbing member.

20. The image recording apparatus according to claim 17, wherein the image recording means comprises an ink-jet head for applying an ink to the recording medium, scanning means for the ink-jet head, an ink cartridge for holding the ink, and an ink-supplying means.

21. The image recording apparatus according to claim 20, comprising a plurality of ink-jet heads for a plurality of colors, and the respective ink-jet heads are arranged in line with the feeding direction of the recording medium.

22. The image recording apparatus according to claim 20, wherein a plurality of ink-jet nozzles are integrated in one body, and the respective nozzles are arranged at an interval twice or more the diameter of ink droplets.

23. The image recording apparatus according to claim 20, further comprising a means for thinning out picture elements when a density of a shot-in ink for an image to be formed on the recording medium exceeds a predetermined level.

24. The image recording apparatus according to claim 20, further comprising a means for thinning out ink ejection when a density of a shot-in ink for an image to be formed on the recording medium exceeds a predetermined level.

25. The image recording apparatus according to claim 20, wherein an ink for use therein contains a pigment of one color selected from yellow, magenta, cyan, and black at a content ranging from 1% to 10% by weight, a polymer emulsion at a content ranging from 0.001% to 0.5% by weight, a glycol at a content ranging from 0% to 10% by weight, and an alcohol at a content ranging from 0% to 20% by weight based on the total weight of the ink.

26. The image recording apparatus according to claim 25, wherein the polymer emulsion is an acrylic polymer emulsion or a vinyl acetate polymer type emulsion.

27. The image recording apparatus according to claim 25, wherein the polymer in the polymer emulsion has a glass transition temperature of not higher than 0° C. as measured by a differential scanning calorimeter.

28. The image recording apparatus according to claim 25, wherein the glycol is ethylene glycol or propylene glycol.

29. The image recording apparatus according to claim 25, wherein the alcohol is selected from aliphatic alcohols of 1 to 6 carbons.

30. The image recording apparatus according to claim 17, wherein the cleaner wipes off the image from the recording medium and holds ink from the image.

* * * * *